United States Patent [19]

Hosoda et al.

[11] 4,295,030
[45] Oct. 13, 1981

[54] PLASMA-ARC CUTTING METHOD

[76] Inventors: Naoyoshi Hosoda, 2-20-18, Denenchofu, Ota-ku, Tokyo; Takeshi Hosoda, 2-22-7, Wakabayashi, Setagaya-ku, Tokyo, both of Japan

[21] Appl. No.: 76,821

[22] Filed: Sep. 19, 1979

Related U.S. Application Data

[63] Continuation of Ser. No. 884,682, Mar. 8, 1978, abandoned.

[30] Foreign Application Priority Data

Mar. 8, 1978 [JP] Japan .................................. 53-34732

[51] Int. Cl.³ .............................................. B23K 9/16
[52] U.S. Cl. ............................ 219/121 PH; 219/137 R; 219/121 PP; 219/75; 219/121 PR
[58] Field of Search ............ 219/121 P, 74, 75, 130.32, 219/130.4, 126, 137 R, 76.16; 313/231.4–231.6

[56] References Cited

U.S. PATENT DOCUMENTS

| 2,617,913 | 11/1952 | Oestreicher | 219/130.32 |
| 2,922,023 | 1/1960 | Hackman et al. | 219/74 |
| 3,715,561 | 2/1973 | Hammarlind | 219/75 |
| 3,832,513 | 8/1974 | Klasson | 219/75 |
| 4,019,017 | 4/1977 | Sitek et al. | 219/130.4 |

FOREIGN PATENT DOCUMENTS

| 284210 | 1/1971 | U.S.S.R. | 219/121 P |
| 305032 | 6/1971 | U.S.S.R. | 219/121 P |
| 496127 | 2/1976 | U.S.S.R. | 219/75 |

*Primary Examiner*—Roy N. Envall, Jr.
*Assistant Examiner*—M. Paschall
*Attorney, Agent, or Firm*—Zarley, McKee, Thomte, Voorhees & Sease

[57] ABSTRACT

A method for cutting by a plasma arc in which the nozzle is directly contacted with the base metal to be cut and is at the same electrical potential, and wherein the electrode is first approached near to the base metal to strike the arc and then withdrawn from it to an appropriate cutting distance, and which permits a thinner cutting line to be made and thinner materials to be cut.

3 Claims, 4 Drawing Figures

PLASMA-ARC CUTTING METHOD

This is a continuation of U.S. application Ser. No. 884,682 filed on Mar. 8, 1978, abandoned, described and claimed in the following specification, said Mar. 15, 1978 application being noted for final rejection on Apr. 19, 1979.

This invention relates to a plasma-arc cutting method which is easily practiced and more effective than a conventional method.

In the operation of a conventional plasma-arc cutting machine, the end of a nozzle is separated by a certain gap from the surface of the base metal to be cut.

Since the electrode of a conventional plasma-arc cutting machine is arranged at a fixed position with respect to the nozzle, the distance between the electrode and the base metal depends directly on the distance between the end of the nozzle and the base metal. The distance between the electrode and the base metal should be maintained within a certain range so as to obtain a stable plasma-arc. Consequently, it requires a great deal of skill to operate a conventional plasma-arc cutting machine. When an operator uses such a cutting machine, he watches the end of the nozzle in order to maintain its proper distance away from the base metal. Hence, because the intense light generated by the arc inevitably comes into his eyes, he requires an eye shield.

Furthermore, it is known that the diameter of the opening cut in the base metal is about twice as large as the diameter of the nozzle when the optimum distance between the nozzle and the base metal is maintained. However, if the diameter of the nozzle is made smaller so as to reduce the diameter of the opening cut in the base metal, at a certain point there results a series arc which is generated via the nozzle. Accordingly, it is impossible to make the diameter of the cut opening as small as one wishes by reducing the diameter of the nozzle.

It is an object of the present invention to provide a plasma-arc cutting method free from the abovementioned defects, in which no skill is required to maintain the distance between the electrode and the base metal, and in which the diameter of the opening cut in the base metal is almost the same as that of the nozzle of the cutting machine, and in which there is no need for the operator to observe the intense light generated by the arc.

This object is accomplished according to the present invention by a plasma-arc cutting method comprising contacting the end of a nozzle with a base metal, an electrode being away from the base metal, during the operation of cutting the base metal; passing an arc from the electrode to the base metal through the nozzle end; and changing the distance between an electrode and the base metal from a first distance employed while striking an arc between them to a second distance employed while cutting the base metal with the arc.

The present invention will now be described in detail with reference to the accompanying drawings, in which.

Figure 1:
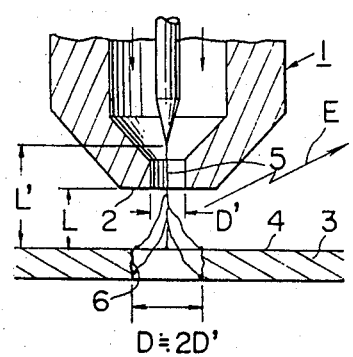
FIG. 1 is a sectional view of the nozzle of a conventional plasma-arc cutting machine.

Referring to the drawings, in FIG. 1 there is shown an essential part of a conventional plasma-arc cutting machine. As the cutting machine 1 is operated, the nozzle end 2 is separated by a certain gap L from the surface 4 of a base metal 3 which is to be cut.

The distance L' between the electrode and the base metal 3 depends on the distance L between the nozzle end 2 and the base metal 3. This distance L' between the electrode and the base metal 3 should be maintained within a certain range so as to obtain a stable plasma-arc 5. Accordingly, it requires a great deal of skill to operate such a plasma-arc cutting machine.

When an operator uses this cutting machine, he watches the nozzle end 2 in order to maintain the proper distance L between the nozzle end 2 and the surface 4 of the base metal 3. Thus, because the intense light generated by the arc 5 inevitably shines into his eyes, he requires an eye shield.

Furthermore, it is known that the diameter D of the opening 6 cut in the base metal 3 is about twice as large as the diameter D' of the nozzle when the optimum distance between the nozzle 2 and the base metal 3 is maintained. However, as explained above, the size of the opening 6 cannot arbitrarily be reduced by reducing the size of the nozzle D', since at a certain point a series arcing problem occurs.

Figure 2:
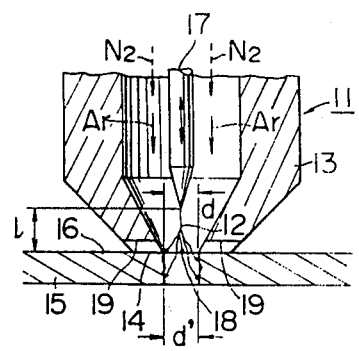
FIG. 2 is a sectional view of the nozzle of a plasma-arc cutting machine according to the present invention.

In FIG. 2 there is shown the essential part of a plasma-arc cutting machine 11 of the present invention, corresponding to the part illustrated in FIG. 1 of a prior-art machine.

The nozzle end 14 of a nozzle 13 is contacted with a surface 16 of a base metal 15. A cathode electrode 17 is then brought towards the base metal 15 in a flow of argon gas, resulting in striking an arc 12. The arc 12 is generated between the electrode 17 and a first anode point 18. Then nitrogen gas is added to the flow of argon gas, the gas flow speed itself may be changed, and the electrode 17 is moved away from the surface 16 to establish the proper electrode distance 1 for cutting. The nozzle 13 is then moved along the base metal surface 16, keeping its contact therewith, and thereby the base metal is cut.

There are provided radially disposed escape grooves 19 of an inverted U-shape for venting the gas flow at the nozzle end 14.

During the cutting of the base metal 15, the range of motion of the anode point 18 formed on the base metal 15 does not expand beyond the nozzle diameter d and no anode point 18 transfer to the nozzle 13 occurs.

This is an engineering fact, and is not fully understood, but is believed to be a consequence of the thermal pinch effect due to the nozzle 13. It can be illustrated in another way.

Figure 3:
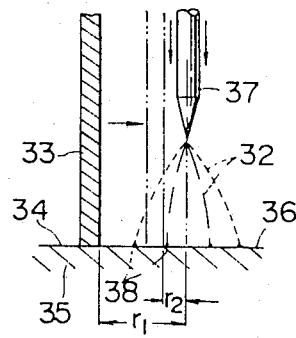
FIG. 3 is a schematic view of a plasma-arc and a wall member of the present invention.

FIG. 3 shows a part of the side wall 33 of the conductive nozzle 13 and the cathode electrode 37. The side wall 33 is in electrical contact with the base metal 35, and is at a fairly large radial distance $r_1$ from the cathode 37. It is found that the anode point 38 formed on the base metal 35 by the arc 32 wanders, and the arc 32 spreads out like a shower, as shown by the dotted lines in FIG. 3.

Now, if the nozzle 13 is changed for a smaller one—that is, one which has a smaller internal radius $r_2$—as indicated by the two-dotted lines in FIG. 3, and the electrical contact of the nozzle 13 with the base metal 35 is maintained, it is found that the anode point 38 does not transfer to the wall member 33. Instead, the arc shower 32 is contracted, as shown by the two-dotted lines in FIG. 3. However, if the electrical contact of the nozzle 13 and the base metal 35 is broken, so that they are electrically isolated from one another, a series arc is generated via the wall member 33 between the cathode 37 and the base metal 35.

In the machine shown in FIG. 2, the reason for mixing nitrogen gas into the stream of argon gas while the base metal 15 is being cut is that then the anode point 13 easily migrates through the thickness of the base metal 15 around the cavity being cut. Accordingly thick base metal may be cut readily.

Since the nozzle end 14 contacts the base metal 15 and surrounds the anode point 18, the anode point 18 cannot wander outwards on the base metal beyond the nozzle. Hence an opening of diameter d' which is almost the same as the nozzle diameter d is obtained. The cutting width is thus reduced by half, compared with that of a conventional process. In other words, the cutting efficiency increases, and therefore the temperature rise of the base metal decreases. Therefore the distortion of the base metal caused by heat when cutting also is much reduced, and consequently a thin piece of base metal may be readily cut, even though heretofore it has been difficult to cut such thin base metal by using a plasma arc.

Figure 4:
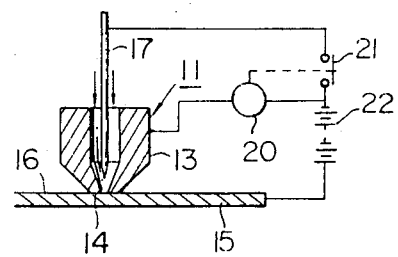
FIG. 4 is a schematic view of the electric circuit of a control means used in a plasma-arc cutting machine according to the present invention.

In FIG. 4, there is shown a control means for the plasma-arc cutting machine of the present invention which utilizes the contact of the nozzle 13 with the base metal 15. The control means includes a relay magnet 20 which is activated by contacting the nozzle 13 with the base metal, thereby closing the contacts 21. Then the electric current is supplied from an electric source 22 to the cathode electrode 17, with the result that the arc 18 is struck, and the plasma-arc cutting machine is started.

The relay device 20 may be further adapted to actuate a control device which automatically adjusts appropriately the time for generating the arc and varies the distance between the electrode 17 and the base metal 15.

From the above description it is readily understood that according to the present invention is provided a plasma-arc cutting machine which is easily operated without emission of intense light, which requires little skill, which makes a cut of reduced width and accordingly is of greater practical efficiency, and which minimises the temperature rise of the base metal so as more readily to process thin base metal. In view of the above-mentioned facts, a small size pencil-type plasma-arc cutting machine can readily be provided. Further, since it is easy to maintain the distance between the electrode and the base metal, this method may be conveniently applied to an automatic plasma-arc cutting machine which is numerically controlled by a computer.

We claim:

1. A plasma-arc cutting method comprising:
   contacting the end of an electrically conductive nozzle having a downwardly tapering lower end portion having a reduced inside nozzle diameter, with a base metal;
   after said contacting, bringing a central electrode surrounded in spaced concentric relation by said nozzle towards the surface of said base metal in a flow of a first inert gas resulting in striking an arc on a first anode point on said base metal while said electrode is away from said base metal;
   adding a second inert gas to the flow of said first inert gas;
   changing the distance between the electrode and said base metal from a first distance employed while striking an arc between said electrode and said base metal to a second distance employed while cutting said base metal with said arc, said first distance being less than said second distance;
   whereby said nozzle and said base metal are at the same electric potential while said base metal is being cut and an opening approximately equal in diameter to said reduced inside nozzle diameter is cut through said base metal.

2. A plasma-arc cutting method according to claim 1, wherein said arc is struck by applying an electric voltage from an electric source by means of a relay device which is actuated by contacting said nozzle with said base metal.

3. A plasma-arc cutting method according to claim 1 wherein said first inert gas is argon and said second inert gas is nitrogen.

* * * * *